United States Patent [19]

Moireau

[11] Patent Number: 5,955,195

[45] Date of Patent: Sep. 21, 1999

[54] GLASS FIBRE SIZE COMPOSITION, METHOD USING SAME, AND RESULTING PRODUCTS

[75] Inventor: Patrick Moireau, Curienne, France

[73] Assignee: Vetrotex France, Chambery, France

[21] Appl. No.: 08/605,060

[22] PCT Filed: Jul. 4, 1995

[86] PCT No.: PCT/FR95/00892

§ 371 Date: Apr. 22, 1996

§ 102(e) Date: Apr. 22, 1996

[87] PCT Pub. No.: WO96/01233

PCT Pub. Date: Jan. 18, 1996

[30] Foreign Application Priority Data

Jul. 5, 1994 [FR] France ................................. 94/08224

[51] Int. Cl.[6] .................................. B32B 3/00; B05D 3/02
[52] U.S. Cl. ..................... 428/392; 428/375; 428/378; 427/385.5; 427/175; 523/400
[58] Field of Search ..................... 428/378, 375, 428/392; 427/385.5, 175, 178, 290; 523/400, 440

[56] References Cited

U.S. PATENT DOCUMENTS

| | | |
|---|---|---|
| 4,530,860 | 7/1985 | Johnson . |
| 4,604,325 | 8/1986 | Pollet et al. ............................ 428/391 |
| 4,609,591 | 9/1986 | Pollet et al. ............................ 428/391 |

*Primary Examiner*—William Krynski
*Assistant Examiner*—J. M. Gray
*Attorney, Agent, or Firm*—Oblon, Spivak, McClelland, Maier & Neustadt, P.C.

[57] ABSTRACT

A sizing composition for glass threads which comprises a solution of a viscosity of less than or equal to 400 cP containing less than 5% by weight of solvent and containing at least one base system which can be thermally polymerised and/or thermally crosslinked, the said base system comprising at least 60% by weight of one or more components that have a molecular mass of less than 750 and preferably less than 500 and that have at least one reactive epoxy function.

23 Claims, No Drawings

GLASS FIBRE SIZE COMPOSITION, METHOD USING SAME, AND RESULTING PRODUCTS

BACKGROUND OF THE INVENTION

1. Field of the Invention

The present invention relates to a sizing composition for glass threads, the said composition reacting under the action of heat. The present invention relates also to a process for the production of sized glass threads which are used, in particular, for reinforcing organic and/or inorganic materials, the said process using the composition mentioned above, and also to the glass threads obtained and the composites produced starting from the said threads.

2. Description of the Background

In the course of the text, "polymerisation", "polymerise", "polymerisable" are to be understood as meaning, respectively, "polymerisation and/or crosslinking", "polymerise and/or crosslink", "polymerisable and/or crosslinkable".

The manufacture of reinforcing glass threads is effected in known manner starting from streams of molten glass flowing from the orifices of one or more die plates. These streams are drawn mechanically in the form of continuous filaments and then the filaments are gathered into one or more basic threads which are subsequently collected on moving supports or undergo other treatments before being collected, depending on the desired applications.

Before they are gathered in the form of threads, the filaments are coated with a size by being passed over a continuously fed sizing member. The depositing of size is necessary in order to obtain threads and enables the threads to be associated with other materials, such as organic and/or inorganic materials, in order to produce composites.

The size acts primarily as a lubricant and protects the threads from the abrasion resulting from the high-speed friction of the threads on various members, such as guide members, during the above-mentioned process.

In the majority of cases, the size also ensures the integrity of the above-mentioned threads, that is to say, the interconnection of the filaments of which they are composed. This integrity, which is obtained especially after polymerising the size deposited on the threads, is generally desired in textile applications where the threads are subjected to great mechanical stresses. If the filaments constituting the threads are poorly integrated with one another they break more easily in the course of such applications and interfere with the operation of the textile machines. In general, the integrity of the threads is often desired because threads that do not exhibit this integrity are considered to be difficult to handle.

The size also provides the threads with the possibility of being associated with various materials to be reinforced with a view to the production of composite parts, by facilitating the wetting and/or impregnation of the threads with the materials to be reinforced and contributing to the creation of bonds between the said threads and materials. In particular, the mechanical properties of the composites obtained from the said material and threads depend on the quality of the adhesion of the material to the threads and on the suitability of the threads for being wetted and/or impregnated by the material.

The provision of suitable sizes for the processes used involves a search for sizing compositions that are sufficiently stable and compatible with the drawing speeds of the filaments that have to pass through them (several tens of metres per second). In particular, the sizes must be able to withstand the shearing induced by the passage of the filaments and must wet the surface of the filaments at the said speeds. Where the sizes used polymerise under the action of heat, it is also necessary for the sizes to have a sufficiently high reaction temperature to remain stable under the die plate. It is also desirable for such sizes to exhibit a substantial degree of conversion after polymerisation (this degree corresponding to the ratio between the number of functions that have reacted in the size after thermal treatment and the number of reactive functions in the size before thermal treatment) in order to ensure that sized glass threads having a constant quality are obtained (a size exhibiting a low degree of conversion being capable of changing over time) and in order to ensure a minimum loss of size in textile applications. Furthermore, in some cases, a high degree of conversion contributes to an improvement in the characteristics of the threads, such as the mechanical characteristics.

Added to these technical considerations are economic considerations and the ease with which the sizes can be used. For the latter reason in particular, the majority of sizes currently used are aqueous sizes which are easy to handle but which have to be deposited on the filaments in large quantities in order to be effective. These sizes comprise a substantial amount of water (90% by weight of the size, in particular for reasons of viscosity, which leads to sized threads containing from 6 to 12% by weight of water), which necessitates the provision of a stage for drying the threads before the threads can be used to reinforce organic and/or inorganic materials, since the water may impair the good adhesion between the threads and the materials. These drying operations are long and expensive, have to be adapted to the manufacturing conditions of the threads (the operations depend on the sizing composition used, on the mass of the threads to be dried . . . ) and their efficacy is not always optimum (especially with regard to rolls of threads or sheets of intermingled threads known as "mats"). In addition, when they are carried out during the fibre-forming operation (that is to say, before the threads obtained by gathering the filaments are collected), in respect of the filaments, as described in WO 92/05122 or in respect of the threads, as described in U.S. Pat. No. 3,853,605, they require the installation of drying devices under each die plate and when they are carried out on finished rolls of threads, they entail the risk of irregular and/or selective migration of the components of the size within the rolls (aqueous sizes already having a tendency, as soon as they have been deposited, to spread over the threads in an irregular manner, owing to their nature) to which are added, in certain cases, the phenomena of the threads' becoming coloured or the rolls' being deformed.

The deformation of the rolls is also observed in the absence of drying, on straight-edged rolls (rovings) of fine threads (that is to say, threads having a linear mass (titre) of the order of from 300 to 600 tex (g/km) or less) coated with aqueous sizes, the said rolls having a generally insufficient firmness (the firmness of such rolls being obtainable only in the case of large angles of intersection which are difficult to obtain in conventional processes for producing sized threads. The angle of intersection is to be understood as being the angle existing between the thread turns belonging to two consecutive layers and the bisecting line of which is contained in a plane perpendicular to the axis of the roll).

A small number of patents propose solutions for reducing the problems of drying sized filaments or threads by using non-aqueous sizes, but the sizes described in these patents generally use organic solvents which are tricky to handle and may impair the health of persons in the vicinity because they are toxic, and/or pose viscosity problems which are expediently solved by heating the said sizes, as described in U.S. Pat. No. 4,604,325 or by adding suitable agents as described in U.S. Pat. No. 4,609,591.

In many cases, the use of such sizes also requires that special devices be installed under each die plate; when the threads coated with these sizes are collected in the form of rolls, it is, in particular, necessary to treat the threads before obtaining finished rolls in order to prevent major adhesion between the turns of each roll, which would make it difficult to unwind the threads. These treatments, the effectiveness of which depends on the operating conditions, consist, for example, in polymerising the size on the threads by subjecting them, over at least a part of their path, to the action of ultraviolet rays in order to impart a sufficient integrity to them and to enable them to be handled as described in U.S. Pat. No. 5,049,407. In that case, however, the polymerised size prevents the filaments from sliding with respect to one another, this lack of mobility being prejudicial to the cutting of the threads (the threads bursting when cut owing to the mechanical degradation of the size) and possibly creating problems in textile applications where the threads used have to exhibit both integrity and pliability (the pliability of the sized threads being linked with the pliability of the size).

A readily handled thread coated with a purely organic size can be obtained without being subjected to a polymerisation treatment. Patent U.S. Pat. No. 4,530,860 describes such sizes which comprise a substantial percentage of film-forming agents, which then act as adhesive agents and impart an integrity to the threads, making them easier to handle.

SUMMARY OF THE INVENTION

The present invention relates to an improved sizing composition which does not have the disadvantages mentioned above, which composition is to coat glass threads and can polymerise under the action of heat, which composition makes sized threads easy to handle, even before polymerisation, and imparts in them a pliability compatible with their later treatments, which composition imparts a good integrity to the threads after polymerisation and exhibits a substantial degree of conversion, which composition also protects the threads effectively against abrasion and enables them to be associated with various materials to be reinforced, with a view to producing composite parts having good mechanical properties, is particulary stable, especially under the die plate, and is compatible with the drawing speeds of the filaments.

The present invention relates also to an improved process for the manufacture of sized glass threads and also to sized glass threads which are easy to handle and have improved characteristics, which threads can reinforce organic and/or inorganic materials effectively for the manufacture of composites.

The sizing composition according to the invention comprises a solution of a viscosity of less than or equal to 400 cP containing less than 5% by weight of solvent and containing at least one base system which can be thermally polymerised, the said base system comprising at least 60% by weight of one or more components that have a molecular mass of less than 750 and preferably less than 500 and that have at least one reactive epoxy function.

DETAILED DESCRIPTION OF THE INVENTION

In one form of the composition according to the invention, the base system also comprises one or more components having a higher molecular mass and having at least one reactive epoxy function and/or one or more components having a reactive hydroxy function and/or a reactive vinyl ether function.

In a preferred form of the composition according to the invention, the composition also comprises at least one Lewis acid or Lewis base thermal initiator.

The invention relates also to a process for the production of sized glass threads wherein a plurality of streams of molten glass flowing from a plurality of orifices arranged at the base of one or more die plates are drawn in the form of one or more fans of continuous filaments, and the filaments are then gathered into one or more threads which are collected on a moving support, the said process consisting in depositing the sizing composition defined above on the surface of the filaments in the course of the drawing operation and before the filaments are gathered into threads.

In an advantageous embodiment of the process according to the invention, the sizing composition is subjected to a thermal treatment in the presence of at least one Lewis acid or Lewis base thermal initiator during or after the collection of the threads coated with the composition.

The invention relates also to threads that are coated with a size having the composition defined above and/or that are obtained in accordance with the above-mentioned process.

In the composition according to the invention, the possible solvents are basically organic solvents necessary for dissolving certain polymerisable compounds. The presence of these solvents in a limited amount does not require special treatments in order to eliminate them; in the majority of cases, the sizes according to the invention are, moreover, completely devoid of solvent, that is to say, of compounds acting solely as solvent in the solution.

Owing to its low viscosity (less than or equal to 400 cP and, preferably, less than or equal to 200 cP), the sizing composition according to the invention is compatible with the conditions for obtaining glass threads imposed by the direct process, that is to say, it can be used in a satisfactory manner regardless of the drawing speed of the filaments that are caused to pass through it (several tens of metres per second) and the diameter of the filaments. The composition also has a wetting speed on the thread which is compatible with the drawing speed of the threads.

A "base system which can be thermally polymerised" according to the invention is to be understood as meaning the compound(s) that is (are) indispensable to the size and the main function of which is to participate in the structure of the size, these compounds being capable of polymerising thermally. The base system generally constitutes between 60 and 100% by weight of the sizing composition according to the invention and, preferably, between 70 and 90% by weight of the composition.

The components that have (a) reactive epoxy function(s) and that can be used in the base system generally comprise from 1 to 4 oxirane functions grafted onto alkyl, cycloalkyl, or aromatic, groupings and may also comprise ether and/or hydroxy and/or ester and/or tertiary amine functions.

These components may be one or more of the following components: monofunctional components, such as alkyl glycidyl ethers having a $C_4$–$C_{16}$ aliphatic chain, or cresyl-, or phenyl-, or nonylphenyl-, or p-tert-butylphenyl-, or 2-ethylhexyl-, glycidyl ethers, epoxy limonenes, or monooxycyclohexenes difunctional components, such as 1,4-butanediol-, or neopentyl glycol-, or resorcinol-, or dimethanol-cyclohexane-, or 1,6-hexanediol-, or dibromo-neopentyl glycol-, diglycidyl ethers, diepoxy derivatives of bisphenols A or F, 3,4-epoxycyclohexylmethyl-3,4-epoxycyclohexanecarboxylates, bis(3,4-epoxycyclohexyl) adipates, diepoxy polyglycols, diglycidyl esters of hexahydrophthalic anhydride, or diglycidyl hydantoins components having more than two identical reactive functions, such as trimethylolethane-, or trimethylolpropane-, triglycidyl ethers, castor oil triglycidyl ethers, para-aminophenol triglycidyl ethers, tetra(paraglycidyloxyphenyl)ethanes, 4,4'-(diglycidylamino)diphenylmethanes, polyglycidyl ethers of an aliphatic polyol, epoxy-polybutadienes, epoxyphenol novolac resins, or epoxycresol novolac resins.

In addition to the component(s) having a molecular mass of less than 750 (or 500) and having at least one reactive epoxy function, the base system may comprise one or more other thermally polymerisable compounds, especially one or more components having a higher molecular mass and having at least one reactive epoxy function and/or one or more components having at least one reactive hydroxy function and/or reactive vinyl ether function.

Preferably, the proportion, in the base system, of component(s) having at least one reactive hydroxy function but not having a reactive epoxy function is less than or equal to 40% by weight of the said system, these components being able to retard the speed of polymerisation of the size and being able to render the size less resistant to water or to chemical agents.

Also preferably, the proportion, in the base system, of component(s) having at least one reactive vinyl ether function but not having a reactive epoxy function is less than or equal to 40% by weight of the said system.

The components that have (a) reactive hydroxy function(s) and that can be used in the base system are basically alcohols or polyols and may be used as flexibilisers and/or crosslinking agents (they then increase the degree of crosslinking of the size) as a function of their spatial configuration and of the number of their reactive groupings.

These hydroxy components may be one or more of the following components: polyol caprolactones or their derivatives, polyols derived from ethylene glycol or from propylene glycol, ethoxylated or propoxylated trimethylolpropanes, ethoxylated or propoxylated pentaerythritols, polyoxypropylene tetrols, or hydroxylated polybutadienes.

The components having (a) reactive vinyl ether function(s) may be one or more of the following components: monofunctional components, such as hydroxyalkyl vinyl ethers, aliphatic or aromatic ester monomers having vinyl ether end groups, 1,4-dimethanol-cyclohexane monovinyl ether polyfunctional components, such as dimethanol-cyclohexane-, or triethylene glycol-, divinyl ethers, aliphatic or aromatic urethane oligomers having vinyl ether end groups.

The component(s) that have (an) epoxy and/or hydroxy and/or vinyl ether function(s) and that are used in the base system of the composition according to the invention may have one (monofunctional components) or more identical reactive functions (polyfunctional components) or different reactive functions from among the epoxy, hydroxy and vinyl ether functions. Preferably, in the base system, the proportion of monofunctional component(s) is between 0 and 75% by weight of the base system and the proportion of polyfunctional component(s) is between 10 and 100% by weight of the base system, the proportion of component(s) comprising more than two identical reactive functions being between 0 and 70% by weight of the base system.

According to a preferred embodiment of the invention, the base system of the composition according to the invention consists in one or more components having at least one reactive epoxy function and, optionally, one or more components having at least one reactive hydroxy function and/or one reactive vinyl ether function.

In another embodiment of the present invention, the base system consists in one or more components having a molecular mass of less than 750 and, preferably, less than 500.

Preferably, the component(s) having a molecular mass of less than 750 (or 500) present in the base system of the composition according to the invention are (mono- or polyfunctional as explained above) monomers, but this base system may optionally comprise components having a molecular mass of less than 750 in the form of oligomers or polymers having partially polymerised functions.

As indicated above, the sizing composition preferably comprises, in addition to the base system, at least one Lewis acid or base thermal initiator permitting the polymerisation of the size under the action of heat. This initiator may also be introduced into the composition by means of a material associated with the sized glass threads before polymerisation, as mentioned hereinafter in the process according to the invention.

A "Lewis acid or base thermal initiator" is to be understood, according to the invention, as meaning any Lewis acid or base and, more generally, any compound that is capable, under the action of heat, of generating a Lewis acid or base, these acids or bases inducing, under the action of heat, the cationic or anionic polymerisation of the epoxy components and, where appropriate, of the hydroxy and/or vinyl ether components. These initiators are also referred to as "cationic or anionic catalysts". Examples of Lewis acid thermal initiators that may be mentioned are the halogen derivatives of Sn, Al, Zn, B, Si, Fe, Ti, Mg, Sb or complexes based on halogenated metals or metalloids, such as the diethyl ether, tetrahydrofuran, aliphatic amine or aromatic amine complexes of $BF_3$ or $BCl_3$, or the amine complexes of $PF_5$ or $AsF_5$ the Lewis base thermal initiators are preferably selected from the cyclic tertiary or secondary amines or tertiary or secondary amines having an aromatic ring (pyridine, 2,4,6-trisdimethylamino-ethylphenol, benzyldimethylamine, piperidine, imidazole derivatives, 2-ethyl-4-methylimidazole, N-$C_1$–$C_{12}$-alkylimidazoles, benzimidazole, amino-oxadiazoles, diaza aromatic tertiary amines (methylpyrazines), diallyltetrahydrodipyridyl) or having double bonds (tetramethylguanidine, or heptamethylisobiguanide) or may also be selected from complex mixtures (alkoxy derivatives of metals, triethanolamine borate or ester borates with chelated metals) or other suitable amines or amine derivatives (triethylamine, diethanolamine, triethanolamine, or tertiary amine oxides). The Lewis acid initiators may be associated with hydrogen donors acting as accelerators, such as propylene carbonate or gamma-butyrolactone. The amount of Lewis acid or base thermal initiators present in the sizing composition and/or introduced into the composition in order to permit good polymerisation is between 0.5 and 6% by weight and, preferably, between 1.5 and 5% by weight of the composition.

Optionally, the sizing composition may comprise other compounds which enable the size to be polymerised.

The composition according to the invention may also comprise a small amount of additives, these additives conferring special properties on the sizing composition but basically not being involved in the structure of the size, unlike the base system. Even if these additives are to be distinguished from the base system, they may nevertheless be thermally polymerisable like the compounds of the base system.

The composition according to the invention may thus comprise as additive at least one coupling agent enabling the size to be coupled to the glass, the proportion of coupling agent(s) being between 0 and 20% by weight of the size and being preferably less than or equal to 15% by weight of the size. These agents preferably have a molecular mass of less than 500 and do not carry primary amine functions. These agents may be one or more of the following components: silanes, such as gamma-glycidyloxypropyltrimethoxysilane, gamma-methacryloxypropyltrimethoxysilane, polyethoxypropoxytrimethoxysilane, gamma-acryloxypropyltrimethoxysilane, or vinyltrimethoxysilane, titanates, zirconates, or siloxanes.

The composition according to the invention may also comprise as additive at least one film-forming agent acting solely as a glidant and facilitating fibre-forming, in proportions between 0 and 15% by weight and preferably less than or equal to 10% by weight. The presence of this/these agent(s) prevents any major friction between the filaments and the sizing device when the filaments are drawn at high speed (more than 40 m/s) and/or when they are very fine, these agents being, however, expensive and possibly entailing a reduction in the mechanical characteristics of the composites. The fibre-forming agents may be one or more of the following components: silicones, siloxanes or polysiloxanes, such as glycidyl(n)polydimethylsiloxane, or alpha,omega-acryloxypolydimethylsiloxane silicone derivatives, such as silicone oils.

The composition according to the invention may also comprise as additive at least one textile application agent acting basically as a lubricant, in proportions between 0 and 15% by weight and, preferably, between 0 and 10% by weight. These textile agents are preferably one or more of the following components: fatty esters (optionally ethoxylated or propoxylated), glycol derivatives (especially ethylene or propylene glycol derivatives), such as isopropyl or cetyl palmitates, isobutyl stearates, decyl laurates, ethylene glycol adipates, polyethylene glycols or polypropylene glycols having a molecular weight of less than 2000, or isopropyl stearates.

The size may also comprise as additive at least one agent for adaptation to the materials to be reinforced, especially in the case of adhesive cementing materials.

The sizing composition according to the invention protects the threads from abrasion in an effective manner, is stable, especially under the die plate (the composition according to the invention not actually polymerising below 100° C. and being subjected under the die plate to temperatures that do not exceed 70° C.), is compatible with the drawing speeds of the filaments and does not necessitate a drying operation before polymerisation or a special treatment between the deposition on the thread and the operation of collecting the sized threads.

In addition, when the composition according to the invention is deposited on the filaments as they are being drawn, it spreads very rapidly over their entire surface and forms a proper protective film for each of them. The thread obtained by gathering the filaments and coated with the composition which has not been subjected to thermal treatment (that is to say, which has not yet been polymerised) thus comprises a bundle of sheathed filaments which can slide on one another, the thread then exhibiting a substantial degree of pliability, which is especially advantageous where the thread is to be cut, the sheathing of the filaments also offering extra protection against abrasion. Such a thread does not exhibit an integrity in the normal sense of the term, that is to say, it is not composed of filaments which are fixed to one another owing, in particular, to an adhesive bond brought about by one or more constituents of the size, such as may be brought about by film-forming agents present in a size in a substantial quantity. Despite that, the thread coated with the composition which has not yet been polymerised is easy to handle and, when it is wound in the form of rolls, is readily extracted from the rolls without undergoing a prior size polymerisation treatment. The threads coated with the sizing composition which has not yet been polymerised are also extremely suitable for wetting and impregnation by materials to be reinforced, and impregnation can thus be effected more rapidly (increase in productivity) and the composites obtained thus have a more homogeneous appearance and some improved mechanical properties.

The integrity proper of the threads, which is obtained by the adhesion of the filaments of which they are composed, is obtained after polymerisation of the sizing composition by the action of heat. This integrity is desirable for threads that have to be subjected to a high degree of mechanical stress, for example in textile applications, or for cut threads which are to reinforce organic and/or inorganic materials. In such cases it is preferable to carry out the polymerisation of the size before using the threads in textile applications or before the cut threads are associated with a material to be reinforced, respectively.

The integrity obtained after polymerising the size is quite substantial, whilst the amount of polymerised size on the threads is relatively low (the loss on heating of the threads coated with the sizing composition and/or obtained in accordance with the process of the invention not exceeding 3% by weight). The amount of sizing composition that has to be deposited on the threads in order to be effective is advantageously very small and results in threads that have very good characteristics, including integrity (the integrity obtained is high even when the amounts of size deposited on the filaments are of the order of 0.6% by weight). This integrity obtained by polymerising a composition according to the invention in the presence of a Lewis acid initiator or, more especially, in the presence of a Lewis base initiator is superior to the integrity obtained under the same conditions with the majority of the conventional sizing compositions.

The sizing composition according to the invention also exhibits a substantial degree of conversion after polymerisation.

Surprisingly, it is found that properties such as the tensile strength of the threads according to the invention are better after ageing than those obtained before the threads age. It is also noted that the mechanical resistance properties of the threads coated with a size according to the invention comprising a Lewis base are superior to those of threads coated with a size according to the invention comprising a Lewis acid, for a lesser loss on ignition.

The threads according to the invention may advantageously be associated with various materials to be reinforced with a view to producing composite parts having good mechanical properties. The composition according to the invention renders the threads particularly compatible with the materials to be reinforced, especially with organic materials and particularly epoxy materials, but also with mineral materials, such as adhesive cementing materials. They also enable the sized threads to be impregnated with the material to be reinforced, this impregnation being facilitated in the case of threads coated with the composition in its non-polymerised form. The sizing composition is especially suitable for the production of continuous threads collected in the form of rovings, cakes, cops, mats . . . , or for the production of cut threads, these various threads being composed of filaments having a diameter that may range from 5 to approximately 24 microns. The sizing composition according to the invention is especially suitable for the production of fine threads (having a titre of less than 600 tex) which are collected in the form of rovings, unlike the conventional aqueous sizes.

The sizing composition according to the invention is advantageously deposited in the course of the process according to the invention on filaments that are to be gathered into threads and is then polymerised under the action of a thermal treatment, the said treatment being carried out independently of the fibre-forming operation (devices thus not being necessary below each die plate) and at any of the various stages of the process after fibre-forming, the sized threads which have not been treated thermally not requiring any special treatment, such as drying, before the thermal polymerisation treatment.

The thermal treatment can be carried out on the collected threads or during the production of a composite by association of the sized threads with an organic material. Where the sizing composition deposited on the filaments according to the process of the invention comprises at least one Lewis acid or base thermal initiator and/or one other compound permitting the polymerisation of the size, and where the threads obtained are collected in the form of rolls, the thermal treatment can be carried out on the rolls of threads before the threads are used, especially in textile applications. If the thermal treatment is carried out on the rolls of threads before unwinding the threads, it is desirable for the thread turns forming the said rolls to have an angle of intersection of at least 1.5° in order to prevent the spirals from becoming stuck together by the polymerised size, which would make it difficult to unwind the threads.

It should be noted that the thermal treatment in the presence of a Lewis acid or base initiator must be sufficiently long to allow the initiator to decompose. Thus, the treatment times for threads collected in the form of rovings weighing several kilograms may be from 3 to 6 hours at 160° C. depending on the form and weight of the roving. However, most of the treatment time is devoted solely to increasing the temperature of the glass mass contained in the roll (by way of comparison, a 50 g sample, initially at 25° C., of a size according to the invention placed in an oven at 160° C. generally requires a treatment time of between 15 and 45 minutes).

The threads obtained after gathering the filaments may not only be collected in the form of rolls on a rotating support but may also be collected on receiving supports moving in translation. They can be projected, by a member which is also used to draw them, towards the collecting surface moving transversely to the direction of the projected threads in order to obtain a sheet of intermingled continuous threads known as a "mat", in which case the thermal treatment can be carried out on the threads spread over the collecting surface. Where appropriate, a binder (which may optionally comprise and introduce into the size a compound permitting its polymerisation, such as a Lewis acid or base initiator) may have been pulverised on the mat before the whole is subjected to thermal treatment and the thermal treatment may permit polymerisation of both the binder and the size.

The threads may also be cut before collection by a member which is also used to draw them, the cut threads being collected on receiving supports moving in translation, in which case the thermal treatment is preferably carried out on the cut threads distributed over the receiving supports (the size deposited on the filaments in that case advantageously comprising at least one Lewis acid or base thermal initiator).

When the threads are collected on (a) translational support (s) and when the thermal treatment is carried out on the support(s), the treatment time is of the order of from 15 to 20 minutes.

The threads may also be collected without being subjected to a thermal treatment, the thermal treatment being carried out later. In particular, the threads may be collected in the form of rolls, and may then be extracted from the rolls in order to undergo supplementary treatments (for example, in order to be cut by a member which also serves to entrain them mechanically), it being possible to carry out the thermal treatment on the threads before, during or after the supplementary treatment(s) (especially in the case of cutting, the thermal treatment can be carried out on the member for collecting the cut threads.)

The sized threads may also be collected without having been subjected to a thermal treatment, and may then be subjected to a thermal treatment after being associated with an organic material during the production of a composite, the said organic material comprising, in the case where the size deposited on the filaments does not comprise a compound permitting the polymerisation of the size and, optionally, in the case where it does contain such a compound, at least one compound enabling the size to be polymerised, especially at least one Lewis acid or base thermal initiator, and introducing the said compound into the said size during the association of the sized threads with the said material. Depending on the organic material used and, optionally, on the initiator(s) and/or catalyst(s) . . . present in the said material, the thermal treatment may be accompanied by an ultra-violet radiation treatment, an electron beam treatment, etc. The thermal treatment time during the production of a composite is generally at least 2 hours.

The glass threads coated with the size according to the invention and/or obtained in accordance with the process of the invention are coated with a non-polymerised size or with a size polymerised after thermal treatment. These threads have a loss on ignition which is advantageously less than 3% by weight and, preferably, less than 1.5%. The small amount of size deposited on the thread substantially reduces the problems of the threads' adhering to one another, especially when they are collected in the form of rolls, and also improves the opening of the thread during impregnation with a material to be reinforced and is economically advantageous.

The threads obtained according to the invention are readily handled and, after collection, may be in various forms which may or may not necessitate supplementary thread-treatment stages, these stages being carried out before or after the thermal treatment and/or the collection of the threads. The glass threads may thus be in the form of continuous threads or cut threads and may have been assembled in the form of braiding, ribbons, mats or woven or non-woven meshes.

The composites advantageously obtained by associating at least some glass threads according to the invention and at least one organic and/or inorganic material have good mechanical properties as illustrated hereinafter in the Examples.

Other advantages and features of the invention will become apparent in the light of the following Examples giving examples of sizing compositions according to the invention and of the characteristics of the threads coated with those compositions or of the characteristics of composites comprising the said threads.

EXAMPLE 1

Filaments 14 microns in diameter obtained by drawing streams of molten glass in accordance with the process of the invention are coated with a size having the following composition expressed in percentages by weight:

| Components of the base system having a molecular mass of less than 750 | |
|---|---|
| 1,2-epoxyhexadecane[1] | 23% |
| 1,4-butanediol diglycidyl ether[2] | 26% |
| epoxidised bisphenol A-type resin[3] | 30% |
| Lewis acid initiator | |
| boron trifluoride/ethylamine complex[4] | 3% |
| propylene carbonate | 3% |
| Additives | |
| gamma-methacryloxypropyltrimethoxysilane coupling agent[5] | 10% |
| isopropyl palmitate textile agent | 5% |

This composition has a viscosity of 40 cP at 20° C. The filaments are gathered into threads which are wound for 3600 seconds in the form of rovings having a mass of approximately 20 kg, and then the rovings are heated to 160° C. for 180 minutes.

The threads are then extracted from the rolls in order to measure their strength and tensile fracture tenacity under the conditions defined by ISO standard 3341. The results on 8–10 specimens (with the standard deviations indicated in brackets) are indicated in the appended Comparative Table I which also gives the titre and the loss on ignition of the threads obtained.

Starting from the threads, composite plates having parallel threads are produced in accordance with NF standard 57152. The reinforced resin is the polyester resin M 402 marketed under that reference by CIBA GEIGY and to which is added, per 100 parts by weight of polyester resin, 20 parts of a softener marketed under the reference "F 8010 C" by CIBA GEIGY, 16.5 parts of styrene and 1.5 parts of an accelerator marketed under the reference "THM 60" by CIBA GEIGY.

The mechanical properties exhibited by these plates, in respect of flexing and shearing, are measured in accordance with the standards ISO 178 and ISO 4585, respectively, before ageing and after immersing the plates in water at 98° C. for 24 hours. The results obtained on 8–10 specimens are indicated in the appended Comparative Table II giving the content by weight of glass in the plates produced, the type of resin used for the plates, the flexural breaking stress, for the above-mentioned content of glass and for a content of glass increased to 100%, before and after ageing, and the shear breaking stress before and after ageing. The standard deviations are indicated in brackets.

EXAMPLE 2

Rolls of thermally treated threads are obtained as in Example 1. The threads are then extracted from the rolls in order to measure their resistance to abrasion. This resistance is evaluated by weighing the quantity of fluff formed after the threads have passed over a series of rods. For various threads coated with the polymerised size described in Example 1, the amount of fluff weighed at the end of the test and expressed in milligrams of fluff per kilogram of tested thread is of the order of 15 mg per kg of thread.

By way of comparison, threads that are coated with an aqueous size based on an emulsion of epoxy resin, silanes and surfactants and that are dried in accordance with customary methods may form 200 or even 500 mg of fluff per kg of thread.

Starting from resulting threads having a titre of approximately 326 tex and a loss on ignition of approximately 0.54%, composite plates are produced in accordance with NF standard 57152. The reinforced resin is the epoxy resin CY 205 which is marketed under that reference by CIBA GEIGY and to which there are added, per 100 parts by weight of epoxy resin, 32 parts by weight of a hardener marketed under the reference "HT 972" by CIBA GEIGY.

The mechanical properties of the resulting plates are measured as in Example 1, before ageing and after immersing the plates in water at 98° C., this time for 72 hours (Table II).

EXAMPLE 3

Filaments 10 microns in diameter obtained in accordance with the invention are coated with a size having the following composition (percentages by weight):

| Components of the base system having a molecular mass of less than 750 | |
|---|---|
| cresyl glycidyl ether[6] | 22% |
| 1,4-butanediol diglycidyl ether[2] | 27% |
| trimethylolpropane triglycidyl ether[7] | 38% |
| Lewis acid initiator | |
| boron trifluoride/ethylamine complex[4] | 3% |
| Additives | |
| gamma-methacryloxypropyltrimethoxysilane coupling agent[5] | 10% |

This composition has a viscosity of 102 cP at 25° C. The filaments are gathered into threads which are wound in order to give cakes having a mass of approximately 6.5 kg and are then heated at 160° C. for 180 minutes. The threads are then extracted from the rolls in order to measure their strength and their tensile fracture tenacity as in Example 1 (Table I).

EXAMPLE 4

Filaments 14 microns in diameter obtained in accordance with the invention are coated with a size having the following composition (percentages by weight):

| Components of the base system having a molecular mass of less than 750 | |
|---|---|
| 1,2-epoxyhexadecane[1] | 21% |
| 1,4-butanediol diglycidyl ether[2] | 26% |
| 3,4-epoxycyclohexylmethyl-3,4-epoxycyclohexanecarboxylate[8] | 37% |
| Lewis acid initiator | |
| boron trifluoride/ethylamine complex[4] | 3% |
| propylene carbonate | 3% |
| Additive | |
| gamma-glycidyloxypropyltrimethoxysilane coupling agent[9] | 10% |

The filaments are gathered into threads which are wound for 2400 seconds in the form of rovings having a mass of approximately 13 kg. The threads thus collected are not subjected to thermal treatment.

Starting from these threads, which are readily extracted from the rolls obtained, composite plates are produced in the same manner as in Example 2 and are then subjected to a thermal treatment, and the mechanical properties of these plates measured under the same conditions as in Example 2 are indicated in Table II.

EXAMPLE 5

Filaments 9 microns in diameter obtained in accordance with the invention are coated with a size having the following composition (percentages by weight):

| Components of the base system having a molecular mass of less than 750 | |
|---|---|
| 1,2-epoxyhexadecane[1] | 15% |
| 1,4-butanediol diglycidyl ether[2] | 24% |
| 3,4-epoxycyclohexylmethyl-3,4-epoxycyclohexanecarboxylate[8] | 30% |
| Lewis acid initiator | |
| boron trifluoride/ethylamine complex[4] | 3% |
| Additives | |
| gamma-methacryloxypropyltrimethoxysilane coupling agent[5] | 5% |
| gamma-glycidyloxypropyltrimethoxysilane coupling agent[9] | 9% |
| alpha, omega-glycidyloxy-alkylpolydimethylsiloxane film-forming agent[10] | 10% |
| ethylene glycol adipate textile agent[11] | 4% |

This composition has a viscosity of 36 cP at 25° C. The filaments are gathered into threads which are wound for 1200 seconds in the form of cakes having a mass of approximately 4.3 kg and the cakes are then heated at 160° C. for 180 minutes.

The threads are then extracted from the rolls in order to measure their strength and tensile fracture tenacity as in Example 1 (Table I).

The resistance of the threads to abrasion is also measured as in Example 2. The amount of fluff weighed at the end of the test is of the order of 100 mg per kg of thread.

EXAMPLE 6

Filaments 14 microns in diameter obtained in accordance with the invention are coated with a size having the following composition (percentages by weight):

| Components of the base system having a molecular mass of less than 750 | |
|---|---|
| cresyl glycidyl ether[6] | 22% |
| dimethanol-cyclohexane divinyl ether[12] | 25% |
| epoxidised bisphenol A-type acrylate resin[13] | 35% |
| Lewis acid initiator | |
| boron trifluoride/ethylamine complex[4] | 3% |
| Additives | |
| gamma-methacryloxypropyltrimethoxysilane coupling agent[5] | 10% |
| gamma-glycidyloxypropyltrimethoxysilane coupling agent[9] | 5% |

This composition has a viscosity of 84 cP at 20° C. The filaments are gathered into threads which are wound for 2400 seconds in the form of rovings having a mass of approximately 13 kg and are then heated at 160° C. for 180 minutes. The strength and the tensile fracture tenacity of the threads are then measured as in Example 1 (Table I).

The resistance of the threads to abrasion is also measured as in Example 2. The amount of fluff weighed at the end of the test is of the order of 5.8 mg per kg of thread.

Starting from the threads obtained, composite plates are produced as in Example 1 and the mechanical properties of these plates measured as in Example 1 are indicated in Comparative Table II.

EXAMPLE 7

Filaments obtained in accordance with the invention are coated with a size having the following composition (percentages by weight):

| Components of the base system having a molecular mass of less than 750 | |
|---|---|
| dimethanol-cyclohexane diglycidyl ether[14] | 35% |
| cresyl glycidyl ether[6] | 27% |

| Components of the base system having a molecular mass of more than 750 | |
|---|---|
| hydroxyepoxypolybutadiene having an average molecular mass of 1800[15] | 25% |
| Lewis acid initiator | |
| boron trifluoride/ethylamine complex[4] | 3% |
| Additives | |
| gamma-methacryloxypropyltrimethoxysilane coupling agent[5] | 10% |

This composition has a viscosity of 186 cP at 25° C. The filaments are gathered into threads which are wound in the form of rovings having a mass of approximately 17 kg and then the rovings are heated at 160° C. for 240 minutes. The strength and the tensile fracture tenacity of the threads are then measured as in Example 1 (Table I).

EXAMPLE 8

A size according to the invention has the following composition (percentages by weight):

| Components of the base system having a molecular mass of less than 750 | |
|---|---|
| purified 3,4-epoxycyclohexylmethyl-3,4-epoxycyclohexane-carboxylate[16] | 35% |
| cresyl glycidyl ether[6] | 25% |
| dimethanol-cyclohexane diglycidyl ether[14] | 10% |
| Σ-caprolactone troil[17] | 15% |
| Lewis acid initiator | |
| boron trifluoride/ethylamine complex[4] | 3% |
| Additives | |
| gamma-methacryloxypropyltrimethoxysilane coupling agent[5] | 12% |

This sizing composition has a viscosity of 92 cP at 20° C.

EXAMPLE 9

A size according to the invention has the following composition (percentages by weight):

| Components of the base system having a molecular mass of less than 750 | |
|---|---|
| 2-ethylhexyl glycidyl ether[18] | 25% |
| dimethanol-cyclohexane diglycidyl ether[14] | 35% |

| Components of the base system having a molecular mass of more than 750 | |
|---|---|
| hydroxypolybutadiene having an average molecular mass of 1220[19] | 20% |
| Lewis acid initiator | |
| boron trifluoride/ethylamine complex[4] | 3% |
| Additives | |
| gamma-methacryloxypropyltrimethoxysilane coupling agent[5] | 8% |

-continued

| | |
|---|---|
| gamma-glycidyloxypropyltrimethoxysilane coupling agent[9] | 5% |
| isopropyl palmitate textile agent | 4% |

This sizing composition has a viscosity of 72 cP at 20° C.

EXAMPLE 10

Filaments 14 microns in diameter obtained in accordance with the invention are coated with a size having the following composition (percentages by weight):

| | |
|---|---|
| Components of the base system having a molecular mass of less than 750 | |
| para-aminophenol triglycidyl ether[20] | 35% |
| cresyl glycidyl ether[6] | 45% |
| Lewis base initiator | |
| N-methyl-diethanolamine[21] | 4% |
| Additives | |
| gamma-methacryloxypropyltrimethoxysilane coupling agent[5] | 10% |
| isopropyl palmitate textile agent | 6% |

This composition has a viscosity of 72 cP at 20° C. The filaments are gathered into threads which are wound for 2400 seconds in the form of rovings having a mass of approximately 13 kg and then the rovings are heated at 140° C. for 8 hours.

The threads are then extracted from the rolls in order to measure their strength and their tensile fracture tenacity as in Example 1 (Table I).

The resistance of the threads to abrasion is also measured as in Example 2. The amount of fluff weighed at the end of the test is less than 1 mg per kg of thread (traces).

EXAMPLE 11

Filaments 9 microns in diameter obtained in accordance with the invention are coated with a size having the following composition (percentages by weight):

| | |
|---|---|
| Components of the base system having a molecular mass of less than 750 | |
| para-aminophenol triglycidyl ether[20] | 35% |
| cresyl glycidyl ether[6] | 45% |
| Lewis base initiator | |
| 2,4,6-tridimethylaminomethyl phenol[22] | 4% |
| Additives | |
| gamma-methacryloxypropyltrimethoxysilane coupling agent[5] | 10% |
| isopropyl palmitate textile agent | 6% |

This composition has a viscosity of 72 cP at 20° C. The filaments are gathered into threads which are wound and heated as in Example 10.

The threads are then extracted from the rolls in order to measure their strength and their tensile fracture tenacity as in Example 1 (Table I).

The resistance of the threads to abrasion is also measured as in Example 2. The amount of fluff weighed at the end of the test is less than 1 mg per kg of thread (traces).

EXAMPLE 12

Filaments 14 microns in diameter obtained in accordance with the invention are coated with a size having the following composition (percentages by weight):

| | |
|---|---|
| Components of the base system having a molecular mass of less than 750 | |
| trimethylolpropane triglycidyl ether[7] | 30% |
| 1,4-butanediol diglycidyl ether[2] | 30% |
| 2-ethylhexyl glycidyl ether[18] | 20% |
| Lewis base initiator | |
| 2-propylimidazole | 4% |
| Additives | |
| gamma-methacryloxypropyltrimethoxysilane coupling agent[5] | 10% |
| isopropyl palmitate textile agent | 6% |

This composition has a viscosity of 40 cP at 20° C. The filaments are gathered into threads which are wound and heated as in Example 10.

The threads are then extracted from the rolls in order to measure their strength and tensile fracture tenacity as in Example 1 (Table I).

The resistance of the threads to abrasion is also measured as in Example 2. The amount of fluff weighed at the end of the test is 1 mg per kg of thread.

COMPARATIVE EXAMPLE

The mechanical characteristics of the composites obtained using the threads described in Examples 1, 2, 4 and 6 are compared with the mechanical characteristics of composites obtained using reference threads coated with an aqueous size based on an emulsion of epoxy resin, silanes and surfactants, the latter composites being produced in the same manner as in Examples 1 and 2, respectively, and the mechanical properties of the latter composites measured as in Examples 1 and 2, respectively, being indicated in Comparative Table II.

It is observed in the preceding Examples that threads coated with size according to the invention are easy to handle regardless of whether they have been subjected to a thermal treatment or not, and have good tensile strength properties. Remarkably and advantageously, the tensile strength properties of the threads coated with size according to the invention are better after ageing than those obtained before the ageing of the sized threads.

The threads obtained in accordance with the invention also exhibit a low loss on ignition and a good resistance to abrasion and enable organic and/or inorganic materials to be reinforced effectively.

The small amounts of fluff obtained during the abrasion resistance tests carried out on the threads (the results obtained for compositions comprising Lewis bases are, in this respect, especially surprising) and the good tensile strength properties of the threads also demonstrate that the threads obtained in accordance with the invention have a high degree of integrity, most of the thermally treated sized threads obtained in Examples 1 to 3, 5 to 7 and 10 to 12 in fact being especially suitable for weaving.

The threads coated with size according to the invention enable composites to be obtained which have mechanical properties which are as good as those of the composites obtained using threads coated with conventional aqueous sizes. In addition, the threads coated with size according to the invention not subjected to thermal treatment may be readily impregnated with materials to be reinforced and yield composites having certain improved mechanical properties (such as shear resistance).

It should also be noted that the threads obtained give good texturing results.

Finally, it is observed that the properties of the threads coated with a size according to the invention comprising a Lewis base are superior to those of threads coated with a size according to the invention comprising a Lewis acid, for a lesser loss on ignition.

The glass threads according to the invention may be used for various applications, for example for textile applications, such as the manufacture of chains by warping, or directly for reinforcing applications, such as the reinforcement of organic materials (for example plastics materials) or inorganic materials (for example cementing materials) in order to obtain composite products.

(1) Marketed under reference "UVR 6216" by UNION CARBIDE
(2) Marketed under reference "Heloxy 67" by SHELL
(3) Marketed under reference "Araldite GY 250" by CIBA GEIGY
(4) Marketed under reference "HT 973" by CIBA GEIGY
(5) Marketed under reference "Silquest A 174" by OSI
(6) Marketed under reference "Heloxy 62" by SHELL
(7) Marketed under reference "Heloxy 5048" by SHELL
(8) Marketed under reference "UVR 6110" by UNION CARBIDE
(9) Marketed under reference "Silquest A 187" by OSI
(10) Marketed under reference "Tegomer Si 2130" by GOLDSCHMIDT
(11) Marketed under reference "Uraplast S 5672" by DSM
(12) Marketed under reference "C.H.V.E." by INTERNATIONAL SPECIALITY PRODUCTS
(13) Marketed under reference "Ebecryl 3605" by UNION CHIMIQUE BELGE
(14) Marketed under reference "Heloxy 107" by SHELL
(15) Marketed under reference "Poly Bd 600" by ELF ATOCHEM
(16) Marketed under reference "UVR 6105" by UNION CARBIDE
(17) Marketed under reference "Tone 0305" by UNION CARBIDE
(18) Marketed under reference "Heloxy 116" by SHELL
(19) Marketed under reference "Poly Bd R20LM" by ELF ATOCHEM
(20) Marketed under reference "Araldite MY 500" by CIBA GEIGY
(21) Marketed by MERCK
(22) Marketed under reference "Actiron NX 3" by PROTEX
(23) Marketed under reference "Actiron NXJ 60" by PROTEX

COMPARATIVE TABLE I

|  | Ex. 1 | Ex. 3 | Ex. 5 | Ex. 6 | Ex. 7 | Ex. 10 | Ex. 11 | Ex. 12 |
|---|---|---|---|---|---|---|---|---|
| Titre (tex) | 320 | 84 | 71 | 318 | 317 | 318 | 320 | 321 |
| Loss on ignition (%) | 1.03 | 0.66 | 0.59 | 0.70 | 0.85 | 0.47 | 0.40 | 0.62 |
| Tensile breaking force (kgf) | 13.3 | 3.5 | 2.7 | 11.5 | 16.7 | 18.7 | 15.9 | 17.9 |
| $\sigma$ | (1.1) | (0.2) | (0.4) | (0.9) | (2.1) | (0.8) | (0.9) | (0.6) |
| Tenacity (g/tex) | 41.6 | 43.2 | 38.5 | 36.2 | 52.8 | 59.1 | 49.7 | 56.3 |
| $\sigma$ | (3.5) | (1.9) | (6.0) | (2.8) | (6.7) | (2.6) | (2.9) | (1.8) |

COMPARATIVE TABLE II

|  | Ex. 1 | Ex. 2 | Ex. 4 | Ex. 6 | Comparative Ex. | Comparative Ex. |
|---|---|---|---|---|---|---|
| Glass content (%) | 67.2 | 68.7 | 66.0 | 66.0 | 66.5 | 67.3 |
| Resin used | Polyester | Epoxy | Epoxy | Polyester | Polyester | Epoxy |
| Flexural breaking stress (Mpa) | | | | | | |
| Before ageing | 1224 | 1004 | 1111 | 1236 | — | — |
| $\sigma$ | (46) | (32) | (49) | (62) | — | — |
| After ageing | 588 | 869 | 780 | 750 | — | — |
| $\sigma$ | (9) | (31) | (33) | (18) | — | — |
| Flexural breaking stress for 100% of glass (Mpa) | | | | | | |
| Before ageing | 2476 | 1929 | 2263 | 2567 | 2440 | 2280 |
| $\sigma$ | (92) | (65) | (99) | (129) | (70) | (40) |
| After ageing | 1189 | 1669 | 1588 | 1558 | 1370 | 1400 |
| $\sigma$ | (19) | (59) | (66) | (38) | (40) | (20) |
| Sheer breaking stress (Mpa) | | | | | | |
| Before ageing | 63.6 | 64.1 | 81.9 | 67.5 | 56.5 | 69.5 |
| $\sigma$ | (1.1) | (0.6) | (1.1) | (1.1) | (1.0) | (1.0) |
| After ageing | — | 53.3 | 56.7 | 37.1 | 25.0 | 40.0 |
| $\sigma$ | — | (0.8) | (1.5) | (0.5) | (0.5) | (0.4) |

I claim:

1. Sizing composition which comprises a solution of a viscosity of less than or equal to 400 cP containing less than 5% by weight of solvent and containing at least one base system which can be thermally polymerized and/or thermally crosslinked, the said base system comprising at least 60% by weight of the base system of one or more compounds that have a molecular mass of less than 750 and that have at least one reactive epoxy function, said sizing composition comprising also at least a Lewis acid or Lewis base thermal initiator.

2. Composition according to claim 1, characterised in that the base system additionally comprises one or more compounds having at least one reactive epoxy function and/or reactive hydroxy function and/or reactive vinyl ether function.

3. Composition according to claim 1, characterised in that the composition also comprises at least one coupling agent in proportions between 0 and 20% by weight.

4. Composition according to claim 1, characterised in that the composition also comprises at least one film-forming agent in proportions between 0 and 15% by weight.

5. Composition according to claim 1, characterised in that the composition also comprises at least one textile agent in proportions between 0 and 15% by weight.

6. Sized glass threads, characterised in that the filaments of said threads are uniformly coated with a non-polymerised and non-crosslinked sizing composition according to claim 1.

7. Composite comprising at least one organic and/or inorganic material and sized glass threads, characterised in that the composition comprises at least some sized glass threads according to claim 6.

8. The composition according to claim 1, wherein the molecular mass is less than 500.

9. Process for the production of sized glass threads wherein a plurality of streams of molten glass flowing from a plurality of orifices arranged at the base of one or more die plates are drawn in the form of one or more fans of continuous filaments, and the filaments are then gathered into one or more threads which are collected on a moving support, the said process consisting in depositing a sizing composition according to claim 1 on the surface of the filaments in the course of the drawing operation and before the filaments are gathered into threads.

10. Process according to claim 9, characterised in that the threads are collected in the form of rolls on a rotating support, the angle of intersection of the rolls being at least 1.5°.

11. Process according to claim 9, characterised in that the sized threads obtained after gathering the filaments are projected by a member, which is also used to draw them, towards a collecting surface moving transversely to the direction of the projected threads in order to obtain a sheet of intermingled continuous threads.

12. Process according to claim 9, characterised in that the sized threads obtained after gathering the filaments are cut before collection by a member which is also used to draw them.

13. Process according to claim 9, characterised in that the sizing composition is subjected to a thermal treatment in the presence of at least one Lewis acid or base thermal initiator during or after the collection of the threads coated with the said composition.

14. Process according to claim 9, characterised in that the collected sized threads are placed in contact with an organic material to be reinforced to form a whole before subjecting the whole to a thermal treatment in order to obtain a composite.

15. Sized glass threads, wherein said threads are formed from filaments that are uniformly coated with a polymerized and/or crosslinked sizing composition, wherein said threads are obtained by a process comprising drawing a plurality of streams of molten glass flowing from a plurality of orifices arranged at the base of one or more die plates in the form of one or more fans of continuous filaments, gathering the filaments into one or more threads, coating a sizing composition on the surface of the filaments in the course of the drawing step and before the gathering step, and collecting the coated one or more threads on a moving support, wherein the sizing composition is subjected to a thermal treatment in the presence of at least one Lewis acid or base thermal initiator during or after the collection step, and wherein the sizing composition comprises a solution of a viscosity of less than or equal to 400 cP containing less than 5% by weight of solvent and containing at least one base system which can be thermally polymerized and/or thermally crosslinked, the said base system comprising at least 60% by weight of one or more compounds that have a molecular mass of less than 750 and that have at least one reactive epoxy function.

16. Composite comprising at least one organic and/or inorganic material and sized glass threads, characterized in that the composition comprises at least some sized glass threads according to claim 14.

17. Sized glass threads, wherein said threads are formed from filaments that are uniformly coated with a sizing composition, wherein the sizing composition comprises a solution of a viscosity of less than or equal to 400 cP containing less than 5% by weight of solvent and containing at least one base system which can be thermally polymerized and/or thermally crosslinked, the said base system comprising at least 60% by weight of one or more compounds that have a molecular mass of less than 750 and that have at least one reactive epoxy function, said sizing composition comprising also at least a Lewis acid or Lewis base thermal initiator.

18. Sized glass threads, wherein said threads are formed from filaments that are uniformly coated with a polymerized and/or crosslinked sizing composition, wherein said threads are obtained by a process comprising drawing a plurality of streams of molten glass flowing from a plurality of orifices arranged at the base of one or more die plates in the form of one or more fans of continuous filaments, gathering the filaments into one or more threads, coating a sizing composition on the surface of the filaments in the course of the drawing step and before the gathering step, and collecting the coated one or more threads on a moving support, wherein the sizing composition is polymerized and/or crosslinked in the presence of at least one Lewis acid or Lewis base thermal initiator, and wherein the sizing composition comprises a solution of a viscosity of less than or equal to 400 cP containing less than 5% by weight of solvent and containing at least one base system which can be thermally polymerized and/or thermally crosslinked, the said base system comprising at least 60% by weight of one or more compounds that have a molecular mass of less than 750 and that have at least one reactive epoxy function.

19. Process for the production of sized glass threads wherein a plurality of streams of molten glass flowing from a plurality of orifices arranged at the base of one or more die plates are drawn in the form of one or more fans of continuous filaments, and the filaments are then gathered into one or more threads which are collected on a moving support, the said process consisting in depositing, on the surface of the filaments in the course of the drawing operation and before the filaments are gathered into threads, a sizing composition which comprises a solution of a viscosity or less than or equal to 400 cP containing less than 5% by weight of solvent and containing at least one base system which can be thermally polymerized and/or thermally crosslinked, the said base system comprising at least 60% by weight of one or more compounds that have a molecular mass of less than 750 and that have at least one reactive epoxy function, and in subjecting said sizing composition to a thermal treatment in the presence of at least one Lewis acid or Lewis base thermal initiator during or after the collection of the threads coated with the said composition.

20. Process according to claim 19, characterized in that the threads are collected in the form of rolls on a rotating support, the angle of intersection of the rolls being at least 1.5°.

21. Process according to claim 19, characterized in that the sized threads obtained after gathering the filaments are projected by a member, which is also used to draw them, towards a collecting surface moving transversely to the direction of the projected threads in order to obtain a sheet of intermingled continuous threads.

22. Process according to claim 19, characterized in that the sized threads obtained after gathering the filaments are cut before collection by a member which is also used to draw them.

23. Process according to claim 19, characterized in that the collected sized threads are placed in contact with an organic material to be reinforced before subjecting the whole to a thermal treatment in order to obtain a composite.

* * * * *

UNITED STATES PATENT AND TRADEMARK OFFICE
CERTIFICATE OF CORRECTION

PATENT NO. : 5,955,195
DATED : September 21, 1999
INVENTOR(S) : Patrick Moireau

It is certified that error appears in the above-identified patent and that said Letters Patent is hereby corrected as shown below:

Column 20,
Line 20, "composition" should read -- composite --;
Line 21, "claim 14." should read -- claim 15. --;
Line 41 "coating," should read -- coating --.

Signed and Sealed this

Seventh Day of August, 2001

*Attest:*

NICHOLAS P. GODICI
*Attesting Officer*     Acting Director of the United States Patent and Trademark Office